United States Patent
Nguy et al.

(10) Patent No.: US 6,950,277 B1
(45) Date of Patent: Sep. 27, 2005

(54) CONCAVE TRAILING EDGE WRITE POLE FOR PERPENDICULAR RECORDING

(75) Inventors: Hai Chi Nguy, San Jose, CA (US); Michael Mallary, Sterling, MA (US); Adam F. Torabi, Shrewsbury, MA (US); Bruce Lairson, Los Altos, CA (US)

(73) Assignee: Maxtor Corporation, Longmont, CO (US)

( * ) Notice: Subject to any disclaimer, the term of this patent is extended or adjusted under 35 U.S.C. 154(b) by 181 days.

(21) Appl. No.: 10/280,881

(22) Filed: Oct. 25, 2002

(51) Int. Cl.$^7$ ............... G11B 5/23; G11B 5/187
(52) U.S. Cl. ............... 360/119; 360/125
(58) Field of Search ............... 360/119, 110, 125, 360/126

(56) References Cited

U.S. PATENT DOCUMENTS

| | | | | |
|---|---|---|---|---|
| 4,769,898 A | * | 9/1988 | Ono et al. ............ 29/603.13 |
| RE33,949 E | | 6/1992 | Mallary et al. ............ 360/110 |
| 5,270,291 A | | 12/1993 | Sun et al. ............ 505/211 |
| 5,363,794 A | | 11/1994 | Lairson et al. ............ 117/7 |
| 5,495,379 A | * | 2/1996 | McNeil et al. ............ 360/125 |
| 5,603,766 A | | 2/1997 | Visokay et al. ............ 117/105 |
| 5,686,193 A | * | 11/1997 | Westwood ............ 428/611 |
| 5,801,910 A | | 9/1998 | Mallary ............ 360/126 |
| 5,822,153 A | | 10/1998 | Lairson et al. ............ 360/234.7 |
| 5,834,085 A | | 11/1998 | Lairson et al. ............ 428/65.3 |
| 5,909,340 A | | 6/1999 | Lairson et al. ............ 360/237.1 |
| 5,973,891 A | | 10/1999 | Neumann ............ 360/126 |
| 6,560,076 B1 | * | 5/2003 | Yazawa et al. ............ 360/317 |
| 6,707,642 B1 | * | 3/2004 | Batra ............ 360/119 |

FOREIGN PATENT DOCUMENTS

JP          4-13209 A   *   1/1992

OTHER PUBLICATIONS

Abstract, 46$^{th}$ Annual Conference on Magnetism & Magnetic Materials, Seattle, Washington Nov. 12-16, 2001, p. 13.

* cited by examiner

*Primary Examiner*—Julie Anne Watko
(74) *Attorney, Agent, or Firm*—Cesari and McKenna, LLP (57) ABSTRACT

A magnetic recording system includes a magnetic medium and a magnetic write head to write information on the magnetic medium. The magnetic write head includes a write pole having a downstream side that has a concave shaped portion when the write pole is viewed from an air bearing surface of the magnetic write head.

16 Claims, 12 Drawing Sheets

FIG. 1

REPLACEMENT SHEET

PRIOR ART

CONCAVE TRAILING EDGE WRITE POLE FOR PERPENDICULAR RECORDING

BACKGROUND

The present invention relates to magnetic data recording, and more particularly, to perpendicular magnetic data recording.

Perpendicular recording has been used to achieve higher recording densities. The National Storage Industry Consortium (SIC) believes that perpendicular recording will become necessary to achieve the densities above 100 Gbit/in$^2$.

Writes for a perpendicular medium with a soft underlayer occur at a trailing (or downstream) edge of the write element. The curvature of the transitions is due to the rectangular shape of the trailing edge of the write element. Also, resolution loss between a write pole tip and the magnetic medium due to a physical spacing between them and saturation of corners of the write element can cause the curvature of the transitions. As widths of write tracks decrease, the resolution loss and the saturation of corners of the write element become larger contributors to the curvature.

As track density increases, edges of the track become a large part of the overall track width. The track edges are characterized by noise and imperfectly written transitions, in particular, the transitions with curvature across the track. Thus, it is important to match a read impulse shape, which is a line, with a written transition shape.

SUMMARY

In general, in one aspect, the invention is directed to a magnetic recording head that includes a write pole having a downstream side that has a concave shaped portion when the write pole is viewed from an air bearing surface of the magnetic recording head.

Embodiments of the invention may include one or more of the following features. The magnetic recording head may include a shield associated with the write pole. The shield may have an upstream side that has a convex shaped portion when the write pole shield is viewed from an air bearing surface of a slider upon which the magnetic recording head is mounted.

Particular implementations of the invention may provide one or more of the following advantages. Providing the downstream side of a write pole with a concave shape (as well as the upstream side of the a write pole shield, if employed, with a convex shape) increases a track width over which a written transition is straight. This serves to narrow the read pulse and increase the high frequency amplitude of the on-track read signal. It also increases the amplitude and resolution of the servo signal, and allows higher track densities for a given track width.

In general, in another aspect, the invention is directed to a write pole tip for a magnetic recording head. The write pole tip includes a downstream layer having a first saturation magnetization and an upstream layer comprising a tip body that has a second saturation magnetization. The downstream layer is wider than the upstream layer.

This aspect include one or more of the following features. The write pole tip may have a trapezoidal shape. The trapezoidal shape has a first width at one end and a second width, the first width being greater than the second width. The downstream layer may be at the first width and the upstream layer may be at the second width. A thickness of the downstream layer may be between 50 nm and 100 nm. At least one side of the write pole tip may be concave in shape. The tip body may include metal alloy.

In general, in another aspect, the invention is directed to a magnetic recording system. The magnetic recording system includes a magnetic medium and a magnetic write head to write information on the magnetic medium. The magnetic write head includes a downstream layer having a first saturation magnetization and an upstream layer comprising a tip body that has a second saturation magnetization. The downstream layer is wider than the upstream layer.

Other features and advantages of the invention will be apparent from the following detailed description, and from the claims.

BRIEF DESCRIPTION OF THE DRAWINGS

Like reference numerals in different figures indicate like elements.

DETAILED DESCRIPTION

Figure 1:
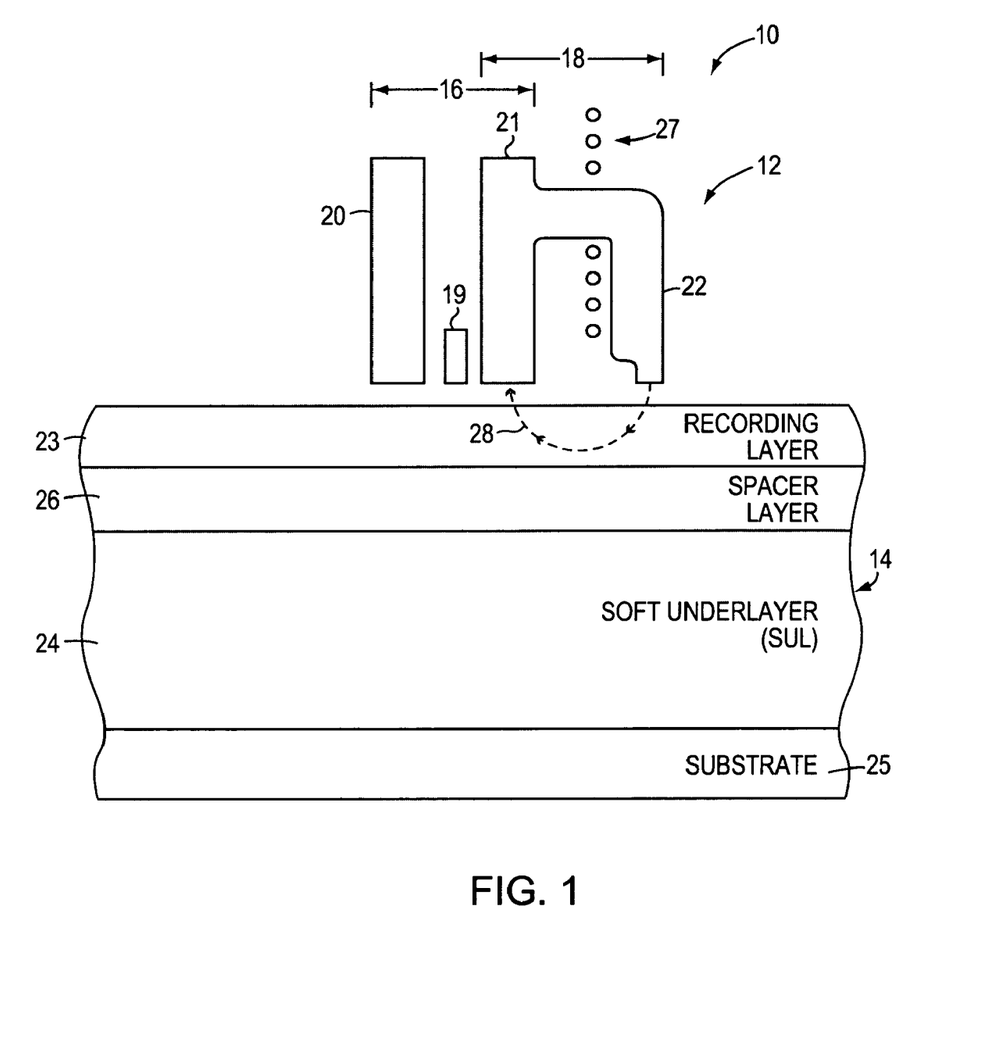
FIG. 1 is a side view of a magnetic recording system including a recording head having a write pole and a medium on which the recording head records information.

Referring to FIG. 1, a simplified magnetic recording system 10 includes a read/write head device 12 and a magnetic recording medium shown as a perpendicular recording medium 14, e.g., a magnetic disk. The head device 12 includes a read portion 16 ("reader") and a write portion ("writer") 18. The reader 16 includes a magnetoresistive sensor 19 located between two shields, shields 20 and 21. The writer includes a top or write pole 22. The shield 21 of the reader 16 also serves as a return write pole for the writer 18. The medium 14 includes a recording layer 23 and a single soft magnetic layer 24, also known as a soft underlayer (or "SUL"), which is formed on a substrate 25. The recording layer 23 and the SUL 24 are separated by a non-magnetic spacer layer 26. During a write operation, a coil 27 in the writer 18 energizes the write pole 22, causing flux to flow primarily along a write field flux path 28, returning to the return write pole 21.

Figure 2A:
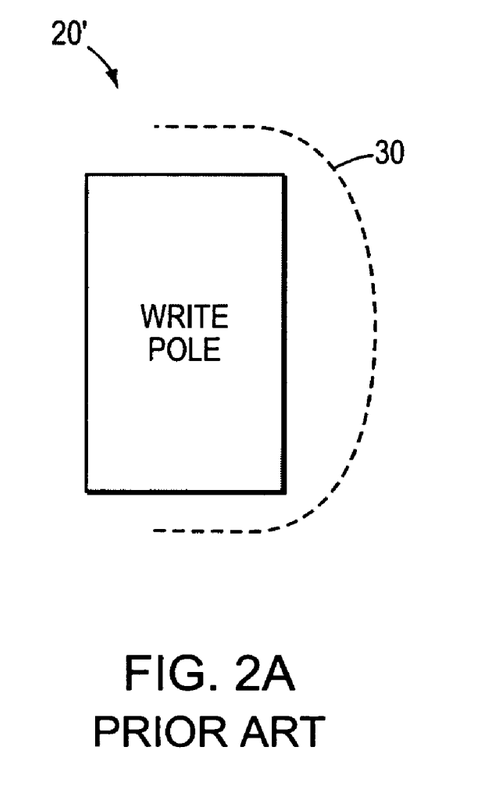
FIG. 2A is an Air Bearing Surface (ABS) view of a conventional rectangular write pole and write field contour generated by the conventional rectangular write pole.

FIG. 2A shows an ABS view of a conventional rectangular write pole embodiment of write pole 22, indicated as write pole 20', and a rounded contour 30 of a switching field generated by the write pole 20'. The rounded contour results in curved-shaped transitions, which limit the readback process as discussed above. That is, at higher densities, because of the curvature of the transitions, the reader 16 straddles transitions of opposite polarity, which cancel each other, thus degrading the quality of the readback signal.

Figure 2B:
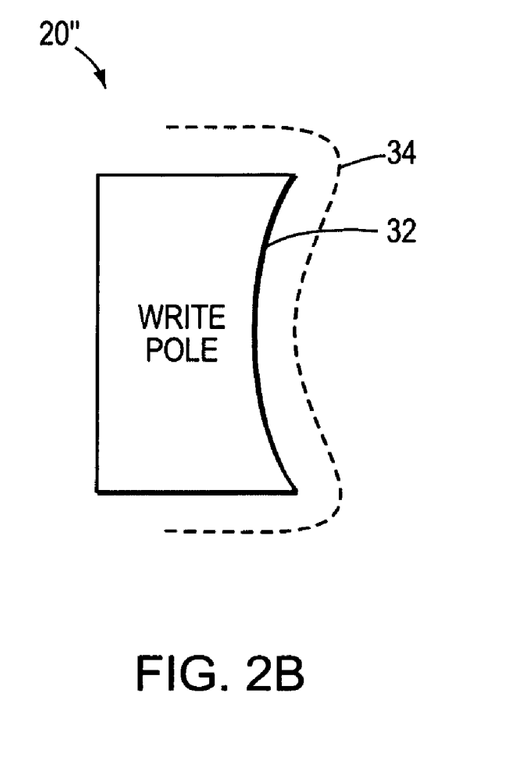
FIG. 2B is an ABS view of a write pole having a concave-shaped downstream side and write field contour generated by such write pole.

FIG. 2B shows an ABS view of an embodiment of the write pole 22 according to the present invention, indicated as write pole 20", that has a concave-shaped downstream side 32, and a somewhat straighter contour 34 of a switching field generated by the write pole 20". One goal of the invention is to shape the downstream side so that the contour of the switching field is as close to a straight line as possible.

Figure 3A:
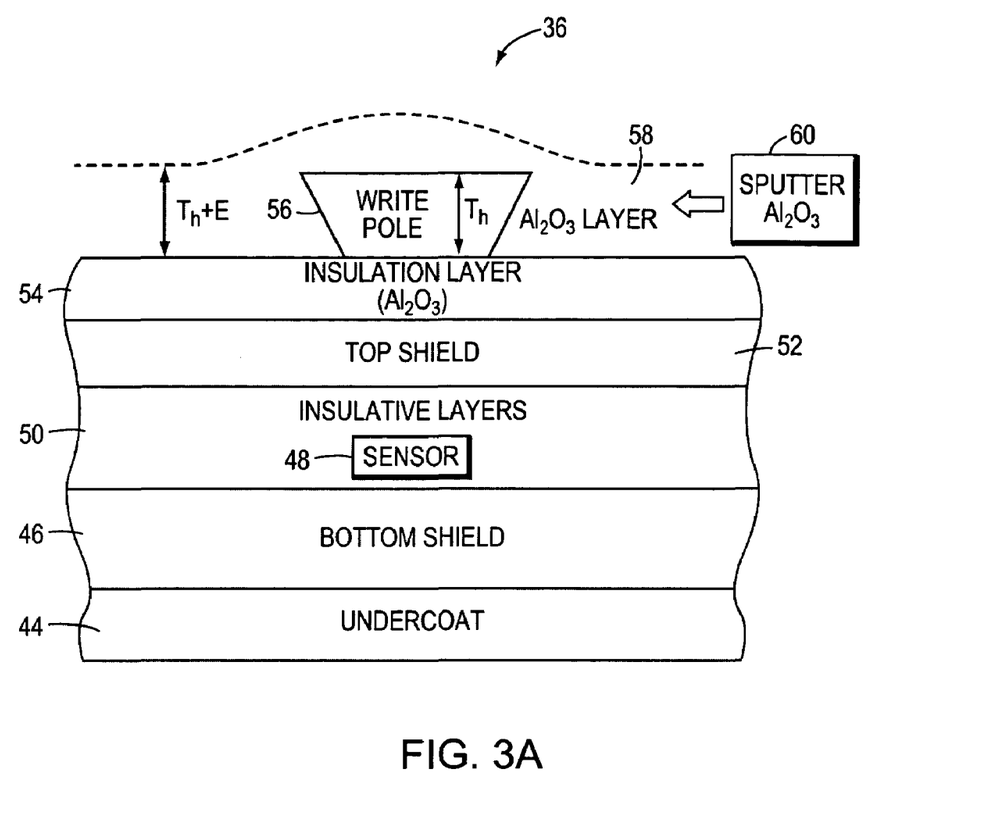
FIGS. 3A to 3C depict stages of a process for fabricating the write pole structure shown in FIG. 2B.
Figure 3B:
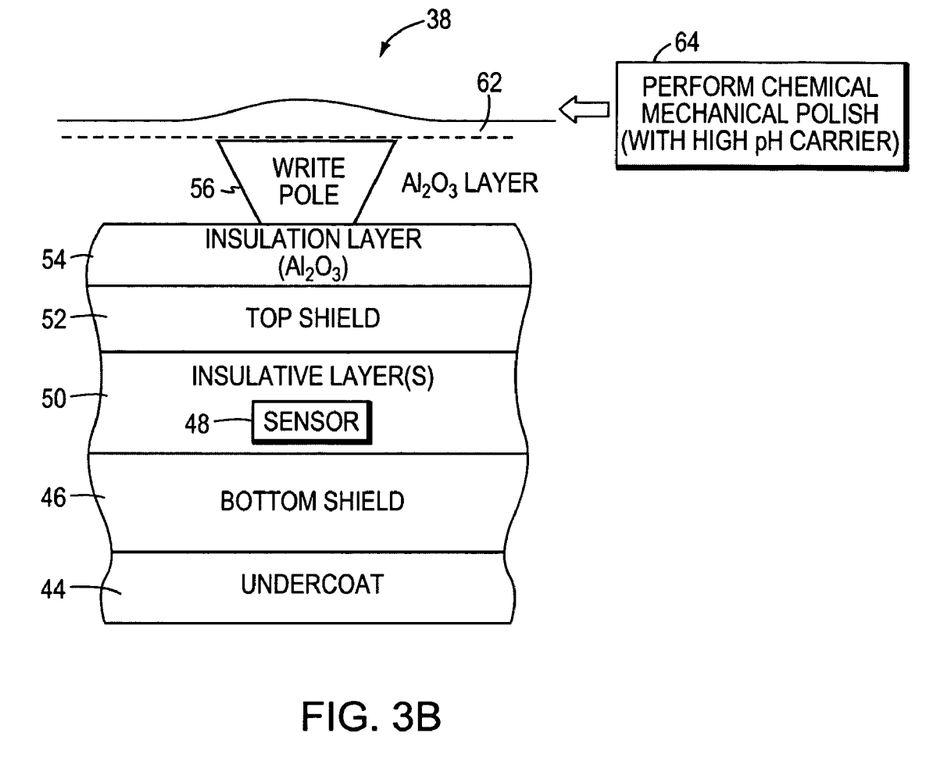
Figure 3C:
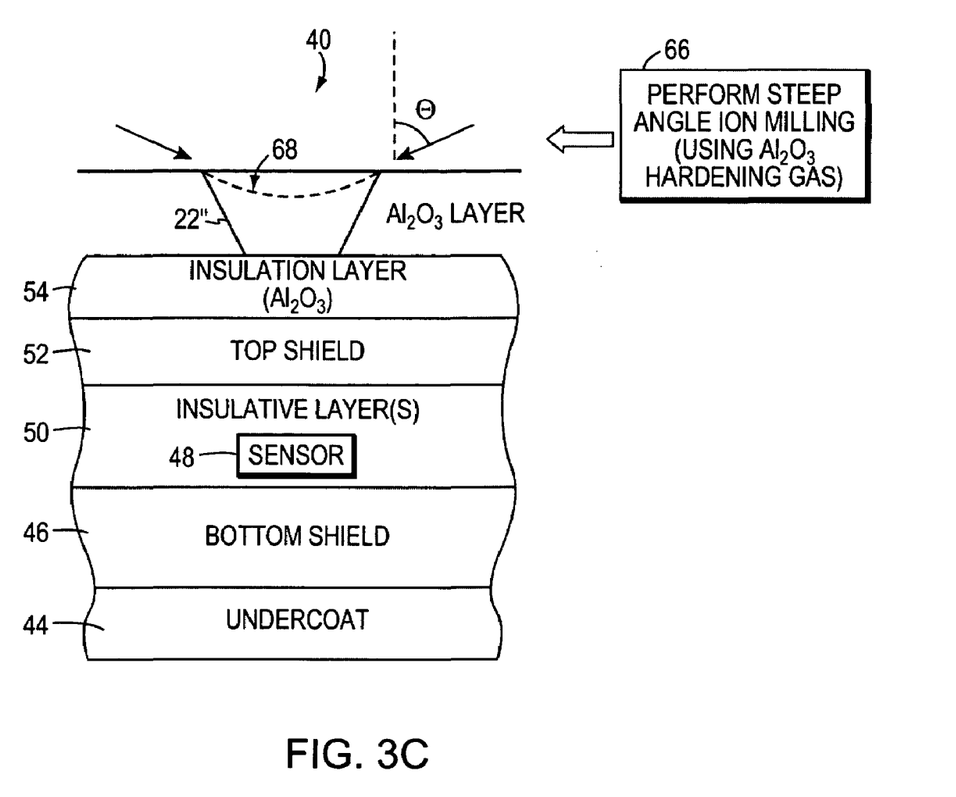

FIGS. 3A–3C show processing stages used to produce write pole 20" shown in FIG. 2B. An ABS view of the head 12 is shown at the various stages of processing, indicated by reference numbers 36, 38 and 40, in FIGS. 3A, 3B and 3C, respectively. Referring to FIGS. 3A–3C, well-known processing techniques may be used to produce the reader 16 (from FIG. 1), including undercoat 44, bottom shield 46, sensor 48, insulative layer(s) 50, top shield 52, as well as insulation layer 54 disposed on the top shield 52, and to produce a "pre-processed" write pole 56, which may be trapezoidal in shape and have a thickness Th (e.g., 0.2 um). Referring to FIG. 3A, to begin processing the write pole 56 for the concave shaped downstream side (from ABS perspective) discussed earlier with reference to FIG. 2B, an aluminum oxide layer ($Al_2O_3$)is sputtered on the write pole 56 and insulation layer 54 (processing stage 60). This new layer 58 has a somewhat greater thickness than the thickness of the write pole 56 (that is, Th+$\epsilon$), for example, if the write pole thickness is 0.2 um, the entire layer 58 could be ~0.3 um.

Referring to FIG. 3B, the surface of the layer 58 is processed using a chemical mechanical polishing process, which grinds back the surface using a chemical and mechanical polishing action to achieve a new, planarized surface 62 (processing stage 64). The chemical mechanical polish process uses particles and an abrasive in a carrier that is chemically active to help etch the surface and soften the surface for the mechanical action. The material used by the process is selected to remove only the $Al_2O_3$. For example, the carrier can be chosen to have a high pH so the carrier attacks (dissolves) the $Al_2O_3$ material, but does not remove the magnetic pole material (which can be, for example, a magnetic alloy such as CoNiFe).

Referring to FIG. 3C, to achieve the concave shape, a steep angle ion milling is performed (processing stage 66). The ion milling process uses in the chamber a gas such as $O_2$, which hardens the $Al_2O_3$, making it difficult to remove the $Al_2O_3$ relative to the magnetic pole material. As a result, a concave trench 68 is formed in the pole material, as the $Al_2O_3$ sidewalls protect the pole edges where the pole material abuts the $Al_2O_3$ but not the center. Thus, the center is etched out more readily, resulting in the concave shape as shown.

The parameters of the process may be profiled for different angles, etch times, and so forth, to optimize the concave shape to achieve the best (straightest) switching field contour and therefore the straightest write transition. Because the processing makes the write pole thinner, it may be necessary to design the write pole to be thicker to offset the effect of the additional processing. Once the concave shape has been achieved, a conventional thick overcoat layer of $Al_2O_3$ is then deposited on the device as an encapsulant. Other techniques, such as focus ion beam milling (FIB) and electron bean lithography, can also be used to achieve the concave shape.

Figure 4:
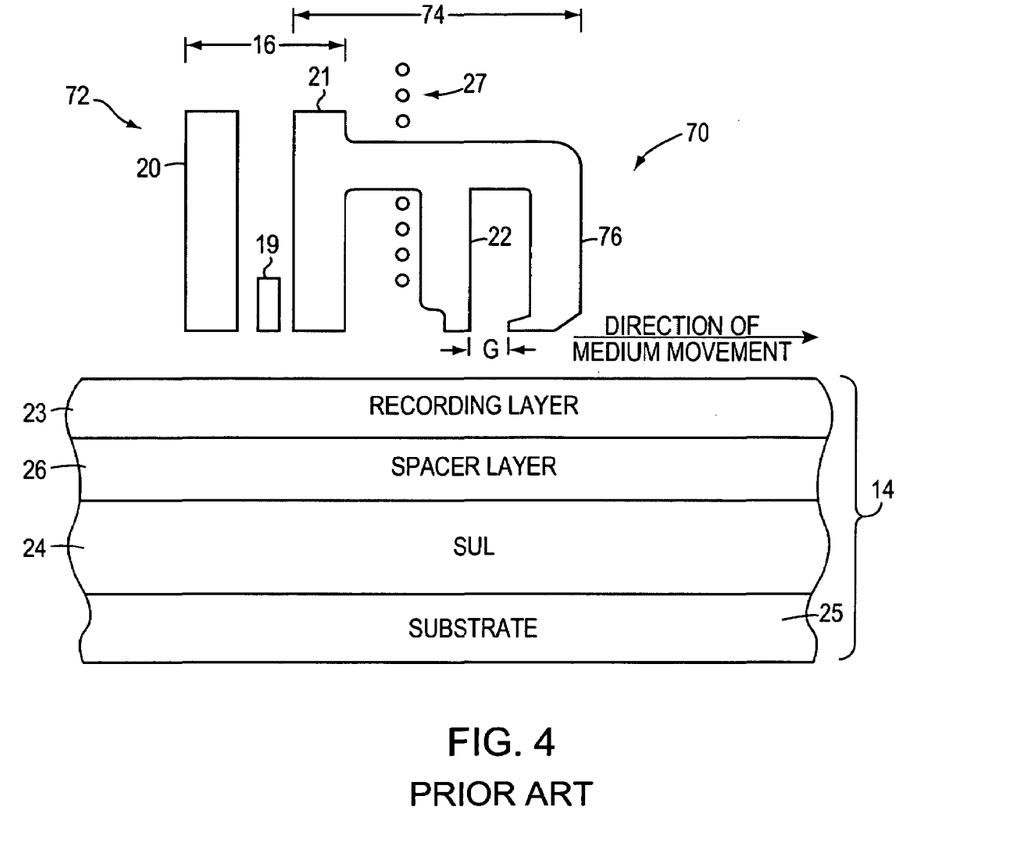
FIG. 4 is a side view of a magnetic recording system including a recording head having a shielded write pole and a medium on which the recording head records information.

Referring to FIG. 4, a simplified magnetic recording system 70 includes a magnetic recording head (read/write head) 72 and a perpendicular magnetic recording medium 14. The head 72 includes a read portion 16 ("reader") and a write portion ("writer") 74. The writer 74 includes a top or write pole 22 and a write pole shield 76 spaced from the write pole 22 by a gap "G". The write pole shield 76 serves to intercept downstream fringing flux emanating from the write pole 22. An example of a shielded write pole can be found in U.S. Patent Re. 33,949, in the name of Mallary et al., incorporated herein by reference.

Figure 5A:
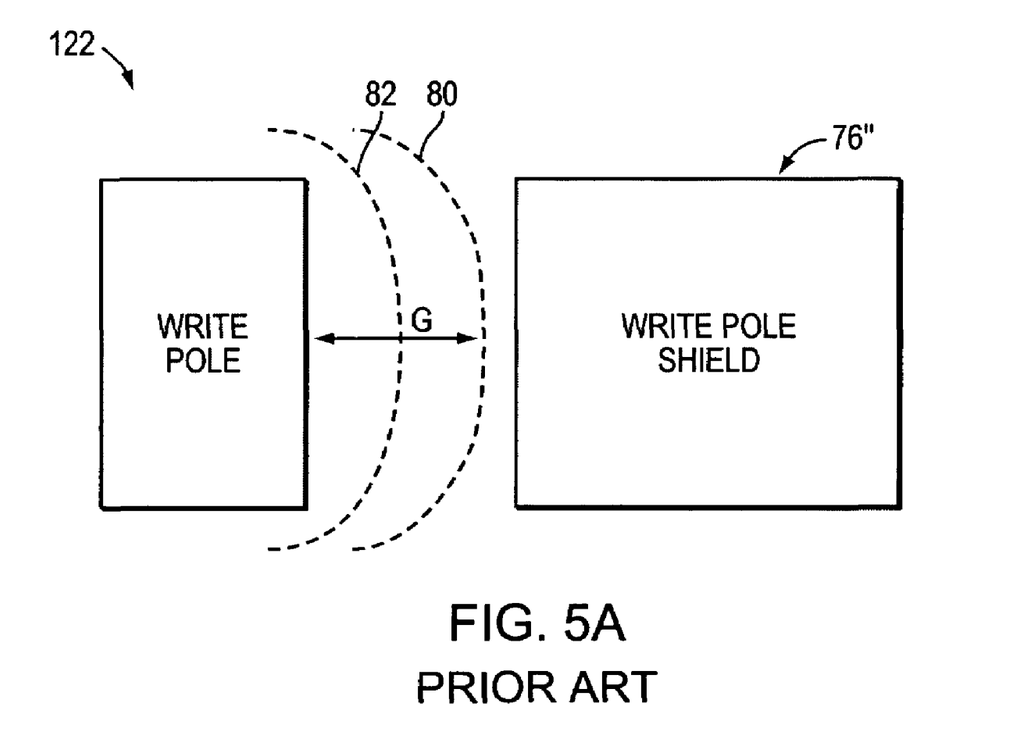
FIG. 5A is an ABS view of a conventional rectangular write pole and conventional write pole shield having a flat upstream side.

As shown in FIG. 5A, the conventional rectangular write pole 122 generates a field in the presence of a conventional implementation of the shield 76, indicated as 76', that has a contour that is somewhat straighter in shape than it would be in the absence of the shield. That is, the shield imposes some degree of regularity to the field shape. Unfortunately, with smaller track densities and larger gaps, the curvature problem persists. A contour 80 represents a contour corresponding to a smaller gap G and contour 82 represents a contour corresponding to a larger gap G. It is possible to reduce the gap G, but a large gap is good for manufacturability as it is proportional to the throat (and stripe height of the MR sensor may be aligned with the throat). Also, if the gap G is too small, the shield may reduce the write field excessively. It may be desirable to design the gap G to be equal to the distance to the SUL ("$D_{sul}$").

Figure 5B:
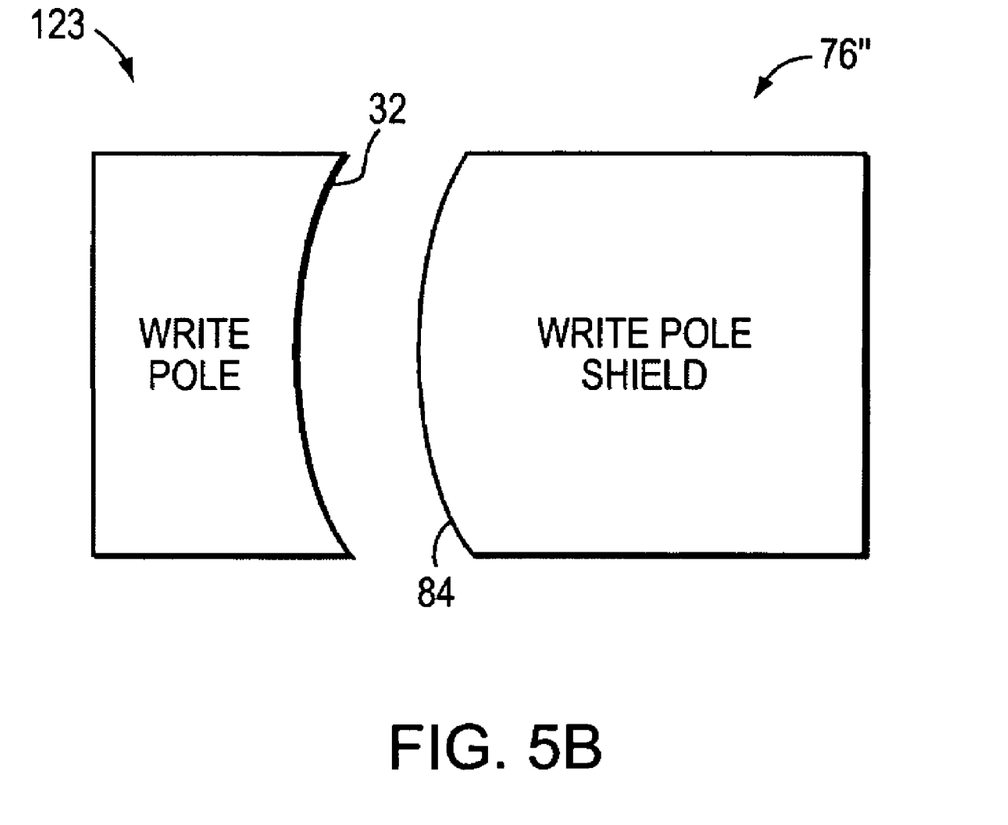
FIG. 5B is an ABS view of a shielded write pole structure including a write pole having a concave-shaped downstream side and a write pole shield having a convex-shaped upstream side.

Thus, to optimize the curvature reduction for a shielded write pole structure, and as shown in an ABS view in FIG. 5B, the write pole 123 having a concave-shaped downstream side 32 is used, as discussed earlier, along with an embodiment of the shield 76, indicated as shield 76", constructed to have a convex-shaped upstream side 84.

Figure 6:
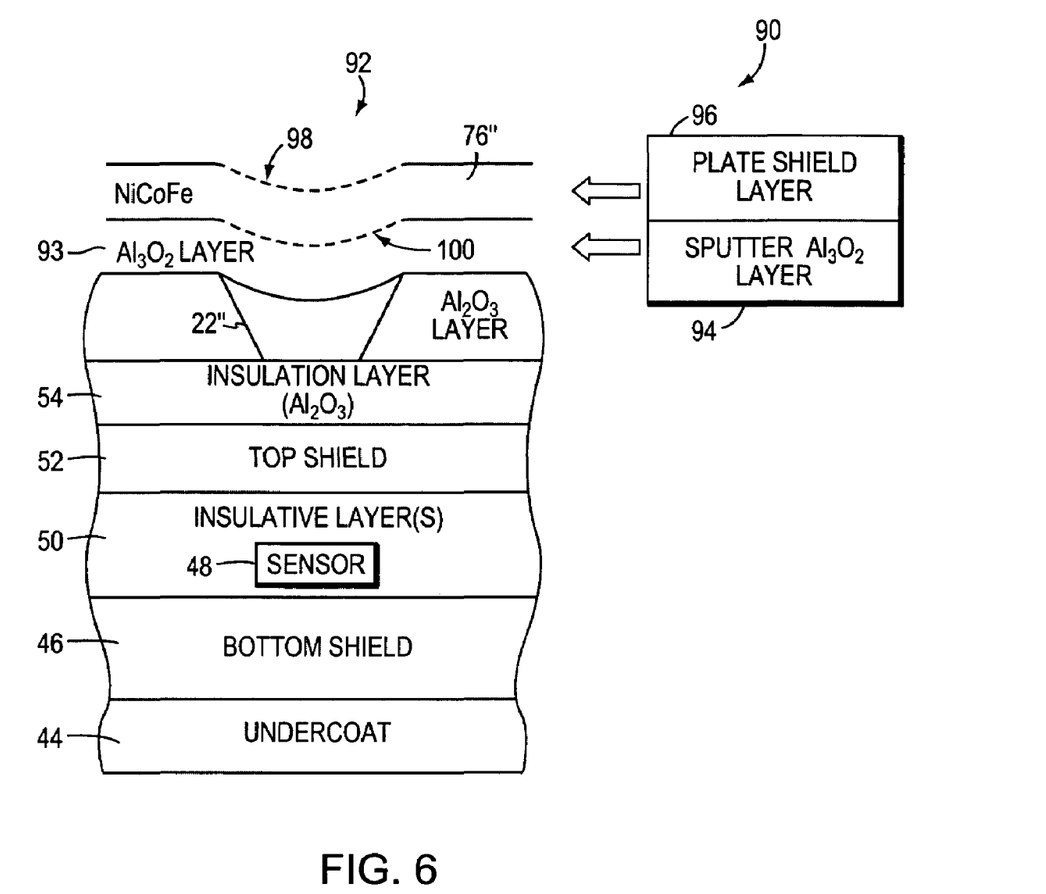
FIG. 6 is a depiction of a process for fabricating the shielded write pole structure shown in FIG. 5B.

FIG. 6 illustrates a process 90 for fabricating the shielded pole 76" as shown in FIG. 5B. Like the process illustrated in FIGS. 3A–3C, an ABS view of the head at the relevant processing stages is shown, indicated by reference number 92. It will be appreciated that the shield processing resumes where the concave shaped write pole processing left off, that is, after stage 66 (but prior to the aluminum oxide overcoat step). The process 90 includes sputtering a thin (e.g., 04 um) gap layer 93, typically aluminum oxide (processing stage 94) and depositing the material for the shield 76", typically a NiCoFe alloy material, e.g., by a plating process, onto the gap layer 93 (processing sage 96). The resulting gap and shield will have a shape 98 that conforms to the shape of write pole 123 (FIG. 5B); that is, the shape of the write pole 123 will be replicated in the subsequent gap and shield layers. Thus, from an ABS view, the upstream side of the shield has a convex shape, indicated by reference number 100, while the downstream side of the write pole 123 has a concave shape. The convex shape is easy to achieve, as a planar shape would require further processing. In addition, the enhancement of the write field gradient provided by the shield 76" is higher in the center than it would be if the upstream side of the shield 76" were flat. The downstream side of the shield 76" and the upstream side of the write pole 123 can have any shape. They need not be flat, as shown in the figures.

Figure 7:
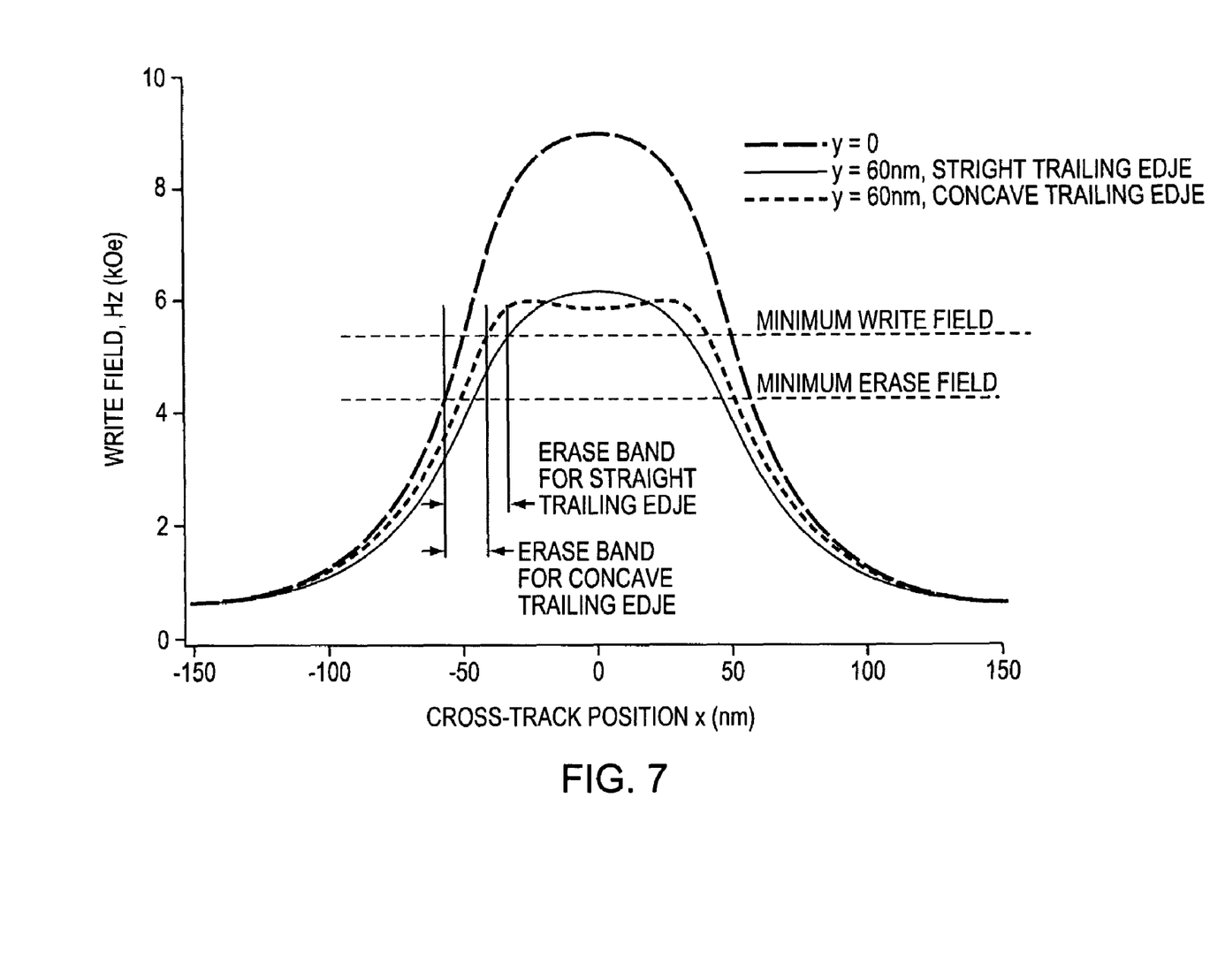
FIG. 7 shows a cross-track field profile for the deep gap field and write (or switching) fields of the write poles shown in FIGS. 2A and 2B, respectively.

FIG. 7 shows the cross-track field profile for the deep gap field (at y=0) and write fields of the downstream side (trailing edge) of the write poles shown in FIGS. 2A and 2B, respectively. The erase width is defined by a maximum width of the field under the write pole greater than the erase (or switching) field for the medium. For the write pole shown in FIG. 2A, this occurs at y=0. For write poles with other shaped poles, for example, trapezoidal, the maximum width would occur elsewhere in the deep gap region, that is, wherever, the head is physically widest. The usable write track width is defined by a portion of the track that is written with enough resolution to be read by a read element, such as a magnetoresistive ("MR") sensor or Giant MR ("GMR") sensor. This is a part of the track at a given down track position "y" where the field amplitude exceeds the write field for the medium. As can be seen in FIG. 7, the write width is larger for the case of the write pole with a concave trailing edge.

Figure 8A:
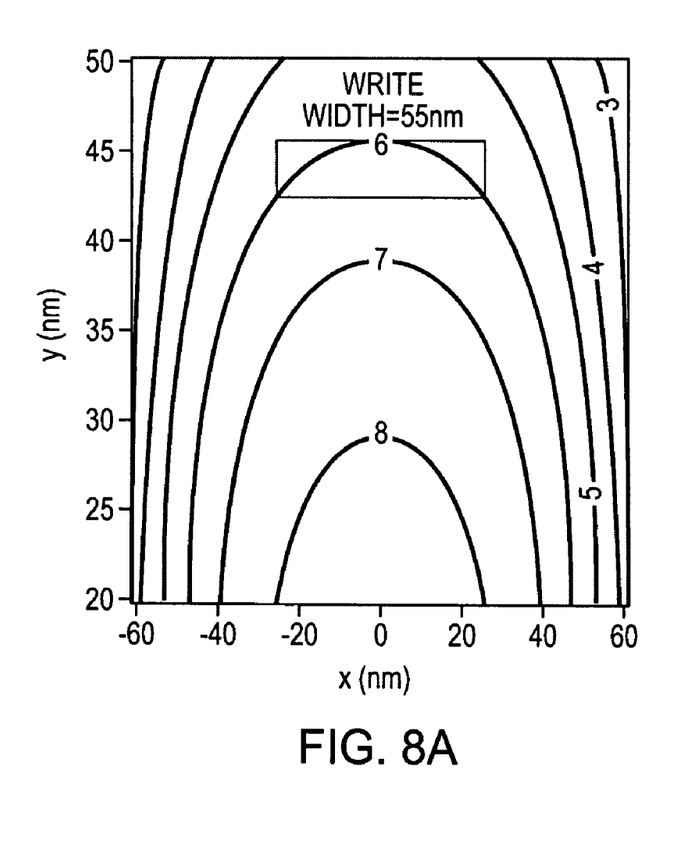
FIGS. 8A and 8B show write track widths for write fields generated by the write poles shown in FIGS. 2A and 2B, respectively.
Figure 8B:
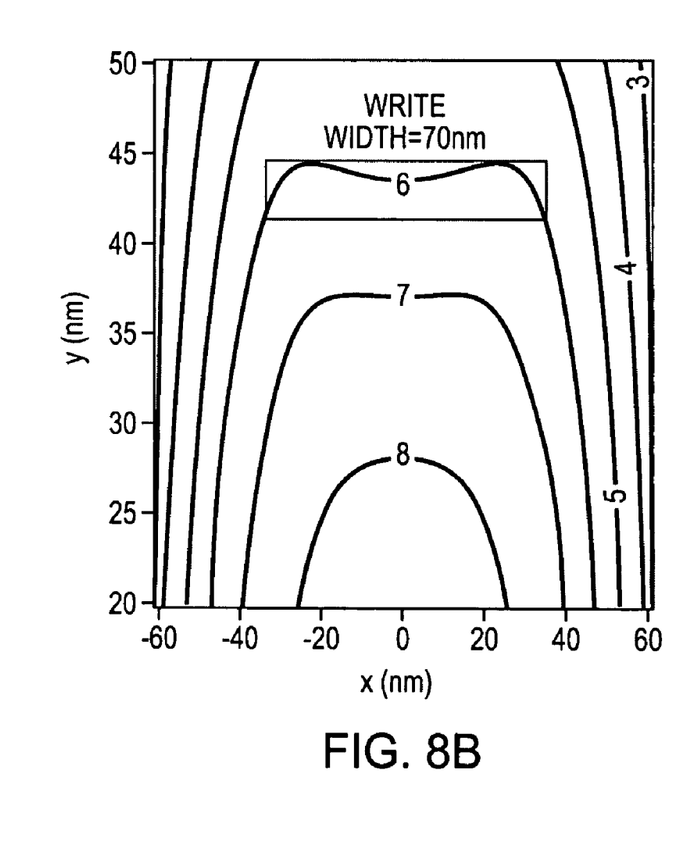

Referring to FIGS. 8A and 8B, the shaded area represents the width of the write track with an arbitrarily defined length in the down track (y) direction. The arbitrarily defined length is 4 nm (nanometers), for example. FIG. 8A shows a width of the write track of the write pole shown in FIG. 2A being 55 nm, and FIG. 8B shows a width of the write track of the concave-shaped write pole shown in FIG. 2B as being 70 nm.

Figure 9:
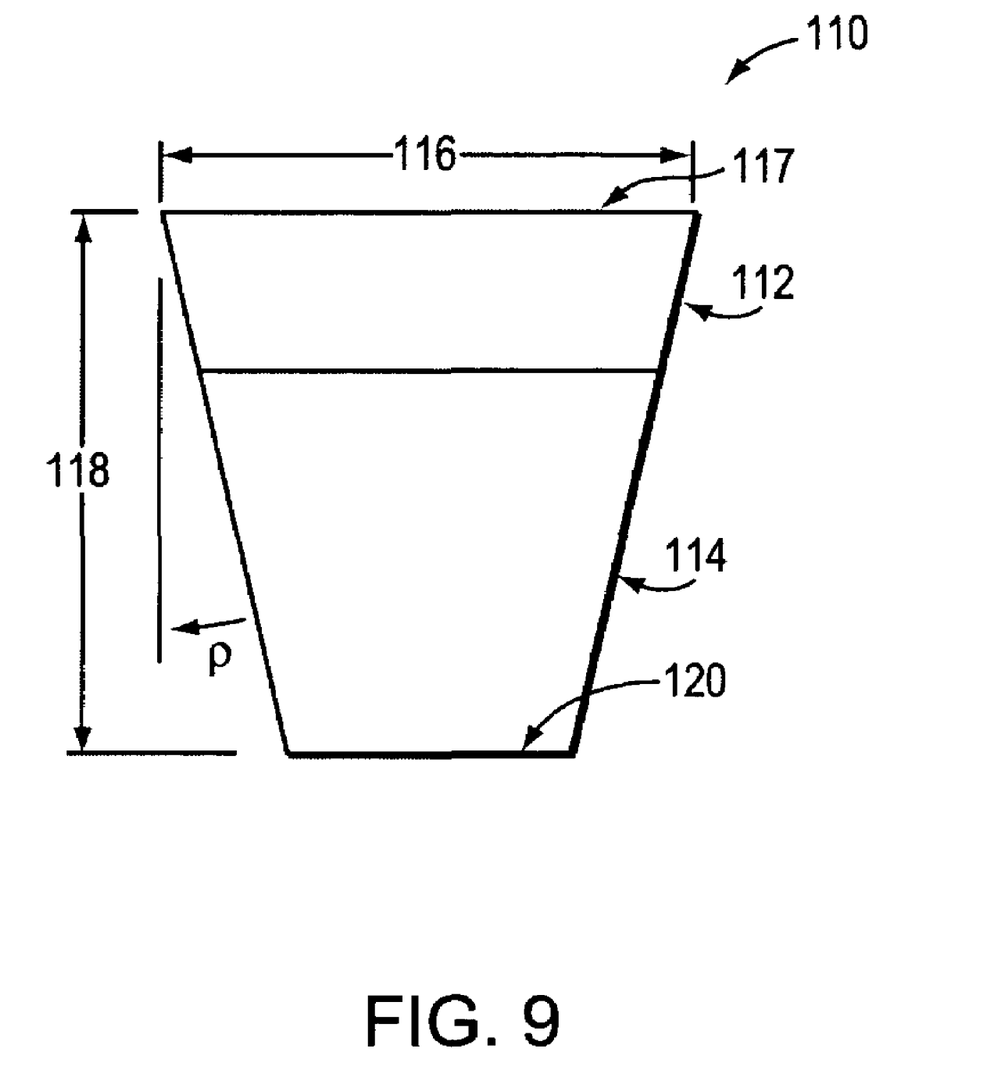
FIG. 9 shows another embodiment of a write pole tip according to the invention.

Straightening the write field contour of the pole tip can be partially accomplished even with a flat downstream edge by providing a thin layer of magnetic material on this edge that has lower saturation magnetization, $M_{sedge}$, than that of the pole tip body, $M_{stip}$. Referring to FIG. 9, such a laminated pole tip 110 may have a trapezoidal shape to allow for track skew with a rotary positioner system. Pole tip 110 includes a thin downstream layer 112 with saturation magnetization $M_{sedge}$, and upstream tip body (layer) 114 with saturation magnetization $M_{stip}$. Ideally, $M_{stip}$ should be as large as possible. Therefore, the tip body 114 could include a nearly balanced alloy of iron and cobalt such as $Fe_xCo_{1-x}$ where $0.5<x<0.65$. A third or fourth element might be included to improve permeability and resistance to corrosion. This region may also be as thick as possible to maximize write field consistent with the degree of bevel that forms the trapezoid and consistent with process limitations. For example, if the width 116 of the downstream edge 117 is 200 nm and the bevel angle ρ is 10 degrees, then the total pole thickness 118 cannot be greater than 567 nm without reducing the upstream edge 120 to zero width.

Process limitations would require a significant size for the upstream edge 120. Therefore a typical pole tip thickness 118 would be about 400 nm. The thickness of the downstream layer 112 depends on $M_{sedge}$, $M_{stip}$, the degree of write field contour straightening required, the width 116 of the downstream edge, the distance between the pole tip 110 and the soft underlayer, and the required write field and its gradient. Optimization with typical values for these parameters would result in a desired thickness of the downstream layer of between 50 nm and 100 nm for $M_{sedge}$, =1T and $M_{stip}$, =2.35 T.

Of course the use of a laminated pole tip 110, with $M_{sedge}$, <$M_{stip}$, can be combined with the shielded pole writer 70. One or both sides of tip 110 can also have a concave shape, such as that shown in FIG. 2B, in order to reduce the required degree of concavity.

Individual features of the embodiments described herein can be combined in ways not specifically described to form new embodiments that are within the scope of the following claims. Thus, other embodiments are within the scope of the following claims.

What is claimed is:

1. A magnetic recording head, comprising:
    a write pole having a downstream side that has a concave shaped portion when the write pole is viewed from an air bearing surface of the magnetic recording head, the write pole being configured to write magnetic domain a perpendicular recording medium.

2. The magnetic recording head of claim 1, further comprising:
    a shield associated with the write pole, the shield having an upstream side that has a convex shaped portion when the shield is viewed from the air bearing surface of the magnetic recording head.

3. The magnetic recording head of claim 2, wherein the shield is a plated magnetic material.

4. The magnetic recording head of claim 1, wherein the concave shaped portion is formed by a steep angle ion milling process.

5. The magnetic recording head of claim 1, wherein the downstream side of the write pole is wider than an upstream side of the write pole.

6. The magnetic recording head of claim 1, wherein the write pole is constructed so its downstream side has a lower station magnetization than its upstream side.

7. The magnetic recording head of claim 6, wherein the write pole contains a first magnetic material having a first saturation magnetization and the downstream side of the write pole is laminated with a second magnetic material having a second saturation magnetization that is less than the first saturation magnetization.

8. The magnetic recording head of claim 6, wherein the downstream side of the write pole is wider than an upstream side of the write pole.

9. A magnetic recording system comprising:
    a magnetic medium adapted to store substantially perpendicular magnetic domains;
    a magnetic write head to write the perpendicular magnetic domains on the magnetic medium;
    the magnetic write head comprising a write pole having a downstream side that has a concave shaped portion when the write pole is viewed from an air bearing surface of the magnetic write head.

10. The magnetic recording system of claim 9, where the magnetic write head further comprises:
    a shield associated with the write pole, the shield having an upstream side that has a convex shaped portion when the shield is viewed from the air bearing surface of the magnetic recording head.

11. The magnetic recording system of claim 10, wherein the shield is a plated magnetic material.

12. The magnetic recording system of claim 9, wherein the concave shaped portion is formed by a steep angle ion milling process.

13. The magnetic recording system of claim 9, wherein the downstream side of the write pole is wider than an upstream side of the write pole.

14. The magnetic recording system of claim 9, wherein the write pole is constructed so its downstream side has a lower saturation magnetization than its upstream side.

15. The magnetic recording system of claim 14, wherein the write pole contains a first magnetic material having a first saturation magnetization and the downstream side of the write pole is laminated with a second magnetic material having a second saturation magnetization that is less than the first saturation magnetization.

16. The magnetic recording system of claim 14, wherein the downstream side of the write pole is wider than an upstream side of the write pole.

* * * * *